United States Patent
Wilson (10) Patent No.: US 11,060,548 B2
(45) Date of Patent: Jul. 13, 2021

(54) CRIMPED CAPPED FASTENER

(71) Applicant: MacLean-Fogg Company, Mundelein, IL (US)

(72) Inventor: Larry J. Wilson, Commerce Township, MI (US)

(73) Assignee: MACLEAN-FOGG COMPANY, Mundelein, IL (US)

( * ) Notice: Subject to any disclaimer, the term of this patent is extended or adjusted under 35 U.S.C. 154(b) by 115 days.

(21) Appl. No.: 16/356,628

(22) Filed: Mar. 18, 2019

(65) Prior Publication Data
US 2019/0211866 A1  Jul. 11, 2019

Related U.S. Application Data (62) Division of application No. 14/976,190, filed on Dec. 21, 2015, now abandoned.

(60) Provisional application No. 62/103,898, filed on Jan. 15, 2015.

(51) Int. Cl.
| | | |
|---|---|---|
| B21K 1/70 | (2006.01) | |
| F16B 37/14 | (2006.01) | |
| B60B 3/16 | (2006.01) | |
| B21D 39/04 | (2006.01) | |

(52) U.S. Cl.
CPC ............ *F16B 37/14* (2013.01); *B21D 39/048* (2013.01); *B21K 1/704* (2013.01); *B60B 3/16* (2013.01)

(58) Field of Classification Search
CPC ........ B21K 1/704; B21K 1/70; B25B 21/001; B67B 3/12; B67B 3/14; B21D 39/046; B21D 39/048; B21D 51/44; B21D 51/48
See application file for complete search history.

(56) References Cited

U.S. PATENT DOCUMENTS

| | | | |
|---|---|---|---|
| 174,766 A | 3/1876 | Bradley | |
| 443,799 A | 12/1890 | Searls | |
| 1,152,960 A | 9/1915 | Moloney | |
| 1,166,722 A | 1/1916 | Stanley | |
| 1,767,184 A | 4/1928 | Marbach | |
| 3,332,211 A * | 7/1967 | Koll | B65B 7/28 |
| | | | 53/353 |
| 3,460,311 A * | 8/1969 | Koll | B67B 3/14 |
| | | | 53/488 |
| 3,638,472 A | 2/1972 | Orloff et al. | |

(Continued)

FOREIGN PATENT DOCUMENTS

| | | |
|---|---|---|
| DE | 10 2009 031 974 A1 | 1/2011 |
| EP | 1 248 004 A2 | 10/2002 |

(Continued)

OTHER PUBLICATIONS

Translation of a Chinese Office Action for related Chinese Application No. 201610026934.1 dated May 24, 2019 (11 pages).

(Continued)

*Primary Examiner* — Edward T Tolan
(74) *Attorney, Agent, or Firm* — Brooks Kushman P.C.

(57) ABSTRACT

A capped fastener is provided with two outer flanges and a groove therebetween. The cap is crimped around the first outer flange without covering the second outer flange. The end of the cap is crimped in a groove between the first and second outer flanges. A crimping tool and method of crimping are also provided for crimping the end of a cap into a groove between two outer flanges.

12 Claims, 6 Drawing Sheets

(56) References Cited

U.S. PATENT DOCUMENTS

| | | | |
|---|---|---|---|
| 3,834,011 A | | 9/1974 | Pinkerton |
| 3,960,047 A | | 6/1976 | Liffick |
| 3,998,032 A | * | 12/1976 | Koebbeman ............... B67B 3/14 |
| | | | 53/352 |
| 4,015,503 A | | 4/1977 | Romano |
| 4,056,862 A | | 11/1977 | Chaivre et al. |
| 4,084,460 A | * | 4/1978 | Garofalo ............... B25B 21/001 |
| | | | 29/240 |
| 4,143,578 A | | 3/1979 | Becker |
| 4,669,937 A | | 6/1987 | Feldman |
| 4,905,447 A | * | 3/1990 | Margaria ............... B67B 3/2066 |
| | | | 53/317 |
| 5,026,237 A | * | 6/1991 | Dorfman ................ B21D 51/34 |
| | | | 413/42 |
| 5,180,266 A | | 1/1993 | Nolan et al. |
| 5,772,377 A | | 6/1998 | Bydalek |
| 8,491,247 B2 | | 7/2013 | Wilson |
| 9,360,040 B2 | | 6/2016 | Milligan et al. |
| 9,593,707 B2 | | 3/2017 | Weis et al. |
| 2003/0068212 A1 | | 4/2003 | Wilson |
| 2013/0216330 A1 | | 8/2013 | Milligan et al. |

FOREIGN PATENT DOCUMENTS

| | | |
|---|---|---|
| EP | 2 196 685 A2 | 6/2010 |
| KR | 10-2011-0007440 | 1/2011 |

OTHER PUBLICATIONS

Extended European Search Report for corresponding European Application No. 16150218.2, dated Feb. 25, 2016, 8p.

* cited by examiner

CRIMPED CAPPED FASTENER

RELATED APPLICATIONS

The present patent document is a divisional of co-pending Non-Provisional U.S. patent application Ser. No. 14/976,190, filed Dec. 21, 2015, which claims the benefit of the filing date under 35 U.S.C. § 119(e) of Provisional U.S. Patent Application Ser. No. 62/103,898, filed Jan. 15, 2015, both of which are hereby incorporated by reference.

BACKGROUND

The present inventions relate generally to fasteners, and more particularly, to a fastener with a cap crimped around a flange.

Fasteners are used in numerous applications to attach various components together. Typically, a fastener has at least a threaded portion and one or more wrenching surfaces thereon. The wrenching surfaces are designed to receive torque from a tool, such as a socket or other wrench, which is used to tighten or loosen the fastener. In a conventional fastener, such as a nut, the fastener may have internal threads and six wrenching surfaces oriented in a hexagonal shape around the internal threads. However, other fasteners may have external threads, such as bolts and screws. Fasteners may also have a different number of wrenching surfaces as desired.

Aesthetics is one concern for certain fasteners, such as automobile wheel nuts. In particular, many automotive consumers are drawn to the aesthetics of an automobile's wheels, since this is often a distinctive part of an automobile. As a result, the wheel nuts become an integral component of the aesthetics of the wheel, and the automobile more generally, since the wheel nuts form a highly visible pattern around the center of the wheel. However, automotive wheel nuts are highly susceptible to corrosion problems due to the wet and salty environment that is often encountered by the wheels of a vehicle. Naturally, corrosion on the visible surfaces of a wheel nut greatly diminishes the aesthetic appearance of the wheel and the automobile generally.

One approach that has been highly successful in addressing wheel nut aesthetics is stainless steel capped wheel nuts. In this solution, a nut body is capped with a stainless steel covering. Since stainless steel is resistant to corrosion, highly durable and visually attractive, stainless steel capped wheel nuts have been capable of addressing a large portion of the demand for aesthetically pleasing wheel nuts. Another advantage of stainless steel capped wheel nuts is that the color of stainless steel, a shiny silverish color, generally matches the color used for most automobile wheels.

Although conventional stainless steel capped wheel nuts have been highly successful, the inventor believes the design of capped fasteners can be improved to lower cost and weight.

SUMMARY

A capped wheel nut is described with a cap covering the wrenching surfaces of a fastener body. The cap wraps around a first outer flange at the bottom of the wrenching surfaces to axially retain the cap on the fastener body. The end of the cap is crimped into a groove between the first outer flange and a second outer flange that the cap does not cover. A crimping tool and method of crimping are also described to crimp the end of the cap. The crimping tool has crimp segments with an internal rib. During crimping, the rib presses radially into the groove of the fastener body to crimp the end of the cap. Additional details and advantages are described below in the detailed description.

The inventions herein may include any of the following aspects in various combinations and may also include any other aspect described below in the written description or in the attached drawings.

A fastener with a crimped cap, comprising: a fastener body comprising a thread, a plurality of wrenching surfaces disposed along a top portion of said fastener body, a first outer flange disposed below said wrenching surfaces and extending outward therefrom, a second outer flange disposed below said first outer flange, and a groove disposed between said first and second outer flanges; and a cap disposed over said wrenching surfaces and said first outer flange, an end of said cap being crimped around said first outer flange, said end being crimped in said groove between said first and second outer flanges, wherein a bottom portion of said fastener body comprising said second outer flange and said thread remains uncovered by said cap.

The fastener wherein said cap is made of metal.

The fastener wherein said cap is made of stainless steel.

The fastener wherein said cap covers a top end of said fastener body.

The fastener wherein said fastener body is a nut and said thread is an internal thread.

The fastener wherein said fastener is an automotive wheel fastener.

The fastener wherein said fastener body comprises a tapered nose below said second outer flange, said tapered nose being uncovered by said cap.

The fastener wherein said tapered nose extends radially inward from said second flange.

The fastener wherein said end of said cap is disposed radially inward from an outer surface of said second outer flange.

The fastener wherein an outer surface of said first outer flange is equal or smaller in size than an outer surface of said second outer flange.

The fastener wherein said end of said cap is disposed radially inward from an outer surface of said second outer flange, and an outer surface of said first outer flange is equal or smaller in size than said outer surface of said second outer flange.

The fastener wherein said cap is made of metal.

The fastener wherein said fastener is an automotive wheel fastener.

The fastener wherein said fastener body is a nut and said thread is an internal thread.

The fastener wherein said cap is made of stainless steel.

The fastener wherein said fastener body comprises a tapered nose below said second outer flange, said tapered nose being uncovered by said cap.

The fastener wherein said tapered nose extends radially inward from said second flange.

The fastener wherein said cap covers a top end of said fastener body.

The fastener wherein said cap is made of stainless steel, said cap covers a top end of said fastener body, said fastener body is a nut and said thread is an internal thread, and said fastener is an automotive wheel fastener.

The fastener wherein said end of said cap is disposed radially inward from an outer surface of said second outer flange.

A tool for crimping a cap onto a fastener body, said fastener body comprising a thread, a plurality of wrenching surfaces disposed along a top portion of said fastener body, a first outer flange disposed below said wrenching surfaces and extending outward therefrom, a second outer flange disposed below said first outer flange, and a groove disposed between said first and second outer flanges, and said cap being disposed over said wrenching surfaces and said first outer flange, an end of said cap being crimped around said first outer flange, said end being crimped in said groove between said first and second outer flanges, a bottom portion of said fastener body comprising said second outer flange and said thread remaining uncovered by said cap, said tool comprising: a fastener holder, said fastener holder configured to hold and support said fastener body and said cap, said fastener body being disposed in said cap, and said fastener holder receiving said top portion of said fastener body and said cap; and a crimp head comprising a plurality of crimp segments spaced circumferentially around said fastener holder, said crimp segments comprising an inwardly extending rib extending circumferentially around said crimp segments, said rib moving axially toward said fastener holder over said second outer flange and toward said first outer flange, and said rib moving radially inward into said groove to crimp said end of said cap into said groove.

The tool further comprising a first stage and a second stage after said first stage, said rib moving axially toward said first outer flange without moving radially inward during said first stage, and said rib moving radially inward into said groove without moving axially toward said first outer flange during said second stage.

The tool further comprising a third stage after said second stage, said rib moving axially within said groove toward said first outer flange without moving radially inward during said third stage.

The tool wherein said fastener holder supports said cap on a top side of said first outer flange.

The tool wherein said crimp head further comprises a centering guide, said centering guide being spring biased against said bottom portion of said fastener body, said centering guide thereby centering said crimp head and said fastener body.

The tool further comprising a crimp head body, said crimp head body comprising an internal cavity and a tapered inner surface tapering outwardly toward said fastener holder, said crimp segments comprising a tapered outer surface tapering outwardly toward said fastener holder, said crimp segments received within said internal cavity of said crimp head body and said tapered inner and outer surfaces engaged therewith, said crimp head body moving toward said fastener holder relative to said crimp segments, said tapered inner and outer surfaces thereby sliding relative to each other and forcing said crimp segments radially inward.

The tool further comprising a first spring disposed between said crimp head body and said crimp segments, said crimp head body and said crimp segments moving together toward said fastener holder during a first stage without compressing said first spring and without said crimp segments moving radially inward, and said crimp head body moving toward said fastener holder relative to said crimp segments during a second stage thereby compressing said first spring and forcing said crimp segments radially inward.

The tool further comprising a second spring disposed between said crimp segments and said fastener body, a bias force of said second spring being higher than said first spring such that said first spring is compressed before said second spring is compressed, said crimp head body and said crimp segments moving together toward said fastener holder during a third stage while compressing said second spring and without said crimp segments moving radially inward.

The tool further comprising a retainer between said crimp head body and said crimp segments, said retainer retaining said crimp segments within said crimp head body, and a spring biasing said crimp head body and said crimp segments against said retainer.

The tool wherein said retainer is disposed between two of said crimp segments disposed adjacent each other.

The tool wherein said retainer is a set screw threaded through said crimp head body, and said adjacent crimp segments comprise a longitudinal groove between said crimp segments, said set screw engaging said groove to retain said crimp segments within said crimp head body.

The tool further comprising a center disposed within said crimp segments, said center comprising a spring and biasing said crimp segments outward against said crimp head body.

The tool wherein said crimp segments move axially away from said center as said crimp head body and said crimp segments move toward said fastener holder, said center thereby only biasing said crimp segments outward before said crimp segments move away from said center.

The tool wherein said fastener holder supports said cap on a top side of said first outer flange, and further comprising a first spring disposed between said crimp head body and said crimp segments, said crimp head body and said crimp segments moving together toward said fastener holder during a first stage without compressing said first spring and without said crimp segments moving radially inward, and said crimp head body moving toward said fastener holder relative to said crimp segments during a second stage thereby compressing said first spring and forcing said crimp segments radially inward.

The tool wherein said crimp head further comprises a centering guide, said centering guide being biased by a third spring against said bottom portion of said fastener body, said centering guide thereby centering said crimp head and said fastener body, further comprising a retainer between said crimp head body and said crimp segments, said retainer retaining said crimp segments within said crimp head body, said first spring biasing said crimp head body and said crimp segments against said retainer, and further comprising a center disposed on said centering guide and within said crimp segments, said third spring biasing said crimp segments outward against said crimp head body, said crimp segments move axially away from said center as said crimp head body and said crimp segments move toward said fastener holder, said center thereby only biasing said crimp segments outward before said crimp segments move away from said center, and said retainer is disposed between two of said crimp segments disposed adjacent each other.

The tool further comprising a second spring disposed between said crimp segments and said fastener body, a bias force of said second spring being higher than said first spring such that said first spring is compressed before said second spring is compressed, said crimp head body and said crimp segments moving together toward said fastener holder during a third stage while compressing said second spring and without said crimp segments moving radially inward.

The tool wherein said retainer is a set screw threaded through said crimp head body, and said adjacent crimp segments comprise a longitudinal groove between said crimp segments, said set screw engaging said groove to retain said crimp segments within said crimp head body.

The tool wherein said fastener holder supports said cap on a top side of said first outer flange, and said crimp head further comprises a centering guide, said centering guide being spring biased against said bottom portion of said fastener body, said centering guide thereby centering said crimp head and said fastener body.

The tool further comprising a first stage and a second stage after said first stage, said rib moving axially toward said first outer flange without moving radially inward during said first stage, and said rib moving radially inward into said groove without moving axially toward said first outer flange during said second stage.

The tool further comprising a third stage after said second stage, said rib moving axially within said groove toward said first outer flange without moving radially inward during said third stage.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
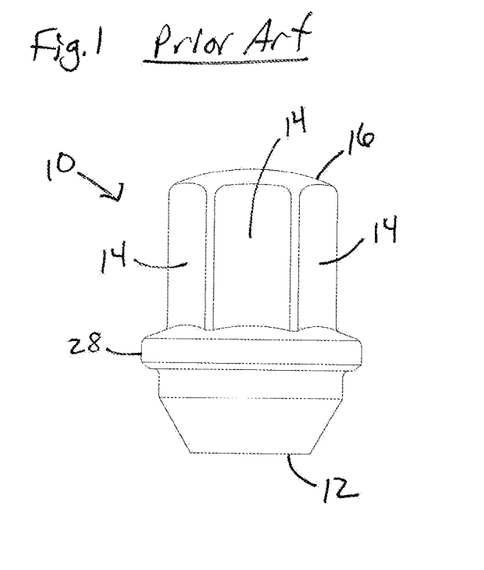
FIG. 1 is a side view of a conventional capped fastener.

Referring now to the figures, a conventional stainless steel capped automotive wheel nut 10 is shown in FIG. 1. Typically, the top portion of the nut body 12, including the wrenching surfaces 14, are covered by the stainless steel cap 16. Thus, when the nut 10 is installed on a wheel, the nut body 12 itself is not visible to casual observers, and the stainless steel cap 16 is the only part of the nut 10 that is readily visible. However, the bottom portion of the nut body 12 is not covered by the cap 16 so that the nut 10 can be threaded onto the wheel without the cap 16 interfering with the threaded engagement.

Figure 2:
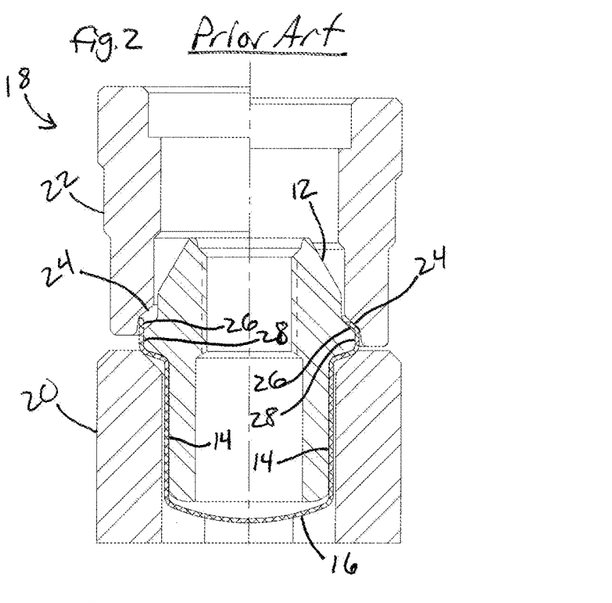
FIG. 2 is a cross-sectional view of a conventional crimp tool for crimping a cap onto a fastener body.

A conventional tool 18 for crimping the cap 16 onto the nut body 12 is shown in FIG. 2. As shown, the nut body 12 is inserted into the cap 16, and the nut body 12 and cap 16 are received within a fastener holder 20. As shown on the left side of FIG. 2, a crimp head 22 then moves toward the fastener holder 20 and an angled surface 24 contacts the end 26 of the cap 16. On the right side of FIG. 2, the crimp head 22 is shown at the bottom of its stroke such that the angled surface 24 of the crimp head 22 has pressed the end 26 of the cap 16 inward against the bottom side of the outer flange 28. Crimping the end 26 of the cap 16 around the outer flange 28 principally serves to axially retain the cap 16 onto the nut body 12 so that the cap 16 does not slide off of the nut body 12 in use.

Figure 3:
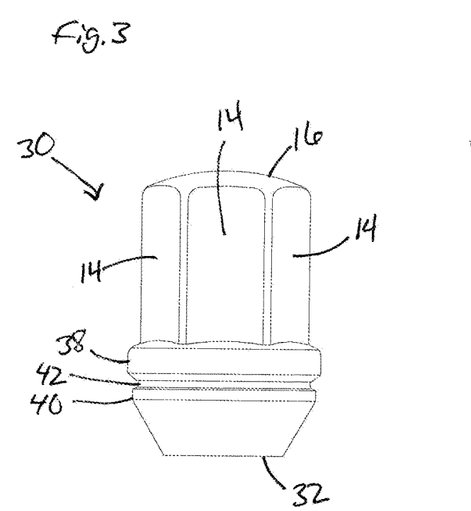
FIG. 3 is a side view of an improved capped fastener.

An improved capped fastener 30 is shown in FIG. 3. Although shown as a nut 30, it is understood that the principles taught herein may be adapted to a bolt with external threads if desired. While it is envisioned that the improved fastener 30 may be particularly useful as an automotive wheel nut 30, it is also possible that the fastener 30 may be useful in other applications as well. Like a conventional capped nut fastener 10, the improved fastener 30 has a fastener body 32 with wrenching surfaces 14 along a top portion. Preferably, the fastener body 32 has six wrenching surfaces 14 in a hexagonal arrangement. The fastener body 32 may also have a longitudinal hole 34 extending therethrough with an internal thread 36 along the bottom portion of the hole 34. The cap 16 covers the top portion of the fastener body 32 including the hole 34 through the fastener body 32. The cap 16 surrounds the wrenching surfaces 14 and generally matches the arrangement of the wrenching surfaces 14 so that a standard socket can be placed over the cap 16 to torque the fastener 30. Thus, the cap 16 must be of sufficient robustness to withstand typical torque used to tighten and loosen automotive wheel nuts 30 without substantially damaging the cap 16. Typically, the cap 16 is made from metal, and in the case of automobile wheel fasteners 30, stainless steel is preferred for the cap 16. If desired, the cap 16 may be pressed onto the fastener body 32, may be welded to the fastener body 32, or may be adhered to the fastener body 32 with adhesives in order to increase the durability of the cap 16 during tightening and loosening of the fastener 30. However, it may be possible that a slip fit between the cap 16 and the fastener body 32 may be sufficient to maintain the desired durability of the cap 16.

Unlike a conventional capped fastener 10, the improved capped fastener 30 has two separate outer flanges 38, 40 that are separated by a groove 42 therebetween. In order to axially retain the cap 16 on the fastener body 32, the end 26 of the cap 16 is crimped around the first outer flange 38, which is located below the wrenching surfaces 14 and extends outward therefrom. Thus, the end 26 of the cap 16 is crimped into the groove 42 between the first and second outer flanges 38, 40. As a result, the second outer flange 40, which is located below the first outer flange 38, and the threaded portion 36 remains uncovered by the cap 16. The second outer flange 40 is preferably defined as the largest functional diameter required of the fastener 30 for clamping purposes. Thus, where the fastener 30 is an automotive wheel nut 30, the second outer flange 40 will be of sufficient diameter to clamp the wheel against the wheel hub. Thus, where the nut 30 has a tapered nose 44 that is tightened into a wheel hole, such as a cone 44 or spherical nose 44, the second outer flange 40 is preferably the outer diameter of the tapered nose 44, with the nose 44 tapering inward from the second outer flange 40 toward the threaded portion 36 and the bottom end of the fastener 30. In a conventional capped wheel nut 10, as illustrated in FIG. 2, the flange 28 that the cap 16 is crimped around must be substantially larger than the outer diameter of the tapered nose 44, or largest clamping diameter, since sufficient clearance is required on the bottom side for the crimping head 22 to crimp the end 26 of the cap 16.

However, in the improved capped fastener 30, the outer flange 38 that the cap 16 is crimped around may be made smaller since the end 26 of the cap 16 is crimped into a groove 42 between the first and second outer flanges 38, 40. Preferably, the end 26 of the cap 16 is pressed into the groove 42 so that the end 26 is positioned radially inward from the outer surface of the second outer flange 40. Also, while it is possible for the first outer flange 38 to be slightly larger in size than the second outer flange 40, it is more preferable for the first outer flange 38 to be either equal in size or smaller in size than the second outer flange 40. In other words, it is desirable for the first outer flange 38 to be as small as possible. As a result, the overall weight of the fastener 30 may be reduced since the outer flange 38 that the cap 16 is crimped around may be significantly reduced in size. For example, this may be result in a weight savings of about 5%-10%. A potential weight savings such as this may be significant for several reasons. Specifically, with respect to automotive wheel fasteners 30, the weight of the fastener 30 is more critical than other components because the fastener 30 is attached directly to the wheel. Because the wheel is located below the suspension system of the vehicle (i.e., between the road and the suspension system), this weight is often referred to as "unsprung weight." In general, it is preferred by automobile manufacturers to reduce the unsprung weight of a vehicle in order to improve handling performance of a vehicle. In addition, since wheel fasteners 30 rotate with the wheel, the weight of the fasteners 30 also has a greater impact on acceleration and deceleration performance of a vehicle. Thus, the weight of an automobile wheel fastener 30 can have a disproportionate impact on the performance of a vehicle. In addition, reducing the weight of a wheel fastener 30 can reduce the cost of the automobile by reducing material costs. This can also be significant due to the quantity of wheel fasteners 30 that are used on a typical automobile. For example, many vehicles use five wheel fasteners 30 on each wheel and have four wheels on a vehicle, which means a total of twenty wheel fasteners 30 are required for each vehicle.

Figure 4:
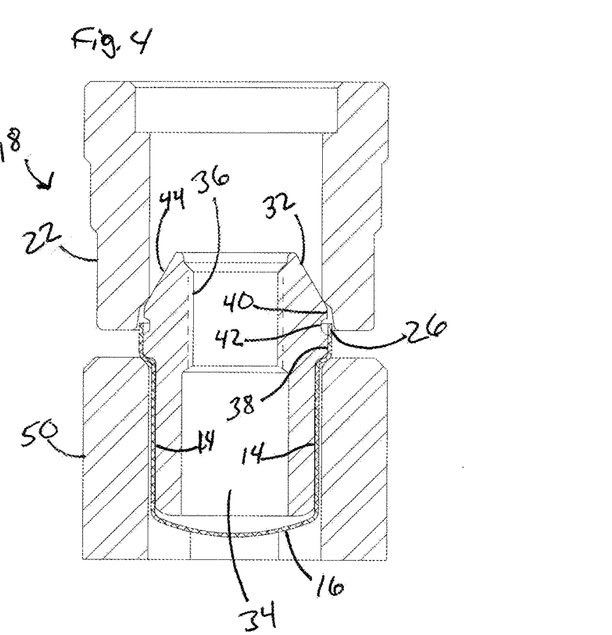
FIG. 4 is a cross-sectional view of a conventional crimp tool with the improved fastener.

One problem with the improved capped fastener 30 with two outer flanges 38, 40 and a groove 42 therebetween is that conventional crimping methods do not work to crimp the end 26 of the cap 16 into a groove 42. For example, as illustrated in FIG. 4, if a conventional crimping head 22 was used to try to crimp the end 26 of the cap 16 on the improved fastener 30, the angled crimping surface 24 will contact the second outer flange 40 before contacting the end 26 of the cap 16. Thus, the improved fastener 30 does not provide sufficient clearance along the bottom side of the first outer flange 38 for a conventional crimping head 22 to crimp the end 26 of the cap 16.

Figure 5:
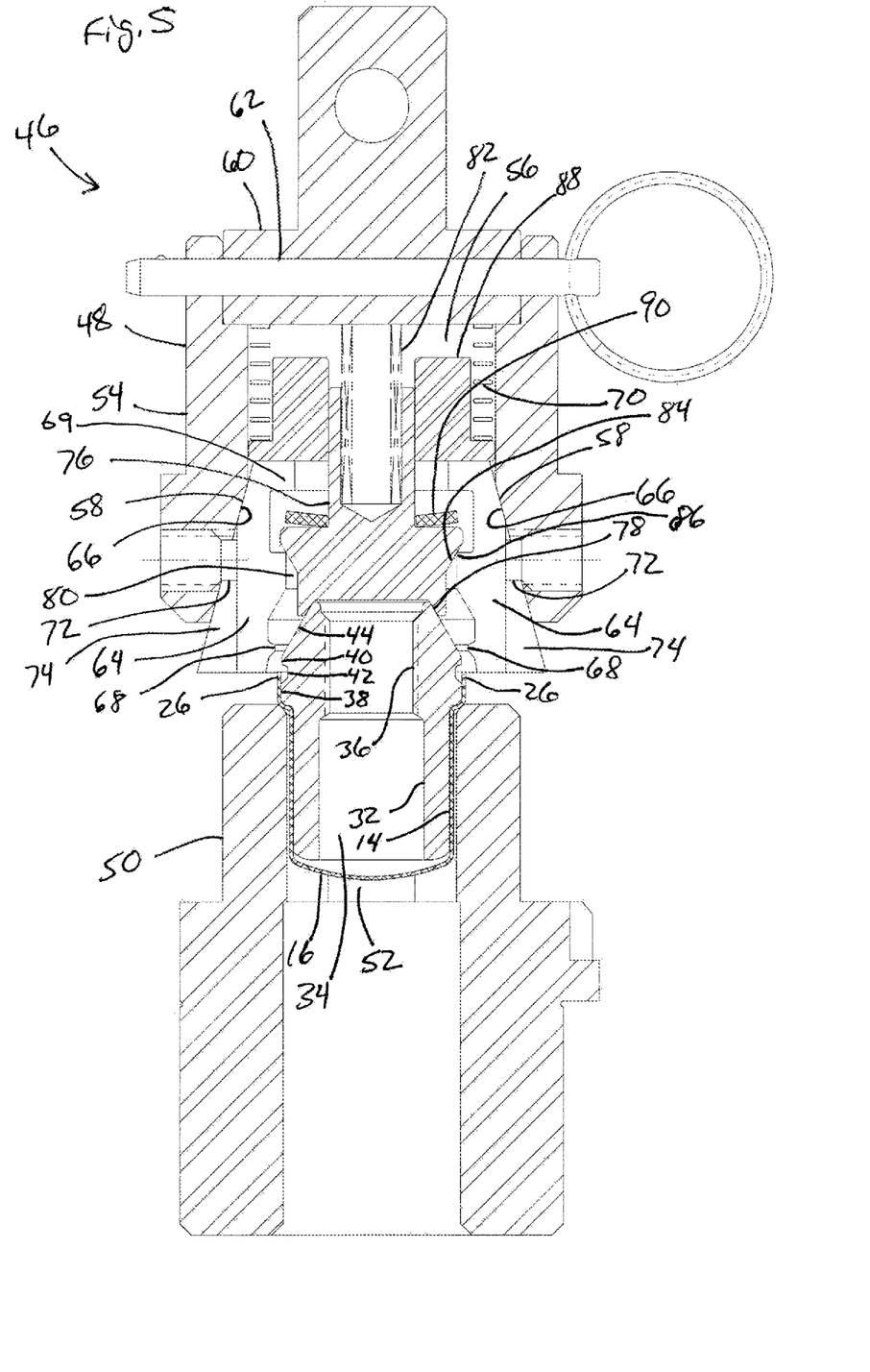
FIG. 5 is a cross-sectional view of a crimp tool for the improved capped fastener at the beginning of a first stage.

Turning to FIGS. 5-9, a crimping tool 46 and method of crimping is illustrated for crimping the end 26 of the cap 16 into the groove 42 of the improved capped fastener 30 described above. In FIG. 5, the crimp tool 46 is shown at a point of first contact between the crimp head 48 and the fastener body 32. The crimp tool 46 includes a fastener holder 50, which will typically be located on the bottom side. The fastener body 32 and the cap 16 are received in the fastener holder 50 with the cap 16 surrounding the top portion of the fastener body 32 (i.e., the top portion of the fastener 30 is received upside down in the fastener holder 50). Thus, the fastener holder 50 holds and supports the fastener body 32 and the cap 16. Preferably, the fastener 30 is held in the fastener holder 50 by gravity. It may be desirable for the fastener holder 50 to have an internal cavity 52 receiving the wrenching surfaces 14 of the fastener 30 to provide additional support. Also, it is preferable for the fastener holder 50 to provide direct axial support to the cap 16 and the top side (bottom in the figures) of the first outer flange 38.

Crimp head 48 may include a crimp head body 54, which may be tubular with an internal cavity 56 having an outwardly tapered inner surface 58. If desired, the crimp head body 54 may also have a drive head 60 that is pinned 62 to the tubular body 54 so that the drive head 60 may be removed for easier assembly and disassembly. A series of crimp segments 64 (also illustrated in FIG. 6) may be circumferentially spaced around the internal cavity 56 of the crimp head body 54. Preferably, the crimp segments 64 are unattached to each other with a longitudinal gap separating each of the crimp segments 64. It is understood that during opening and closing of the crimp segments 64 as described below, the separating gaps will widen and narrow to allow radial movement of the crimp segments 64. The crimp segments 64 may have an outwardly tapered outer surface 66 corresponding to the inner taper 58 of the crimp head body 54. Thus, the tapered surfaces 58, 66 of the crimp segments 64 and the crimp head body 54 are designed to engage each other and slide along the respective tapered surfaces 58, 66 as further described below. The crimp segments 64 may also have an inwardly extending rib 68 that extends circumferentially around the crimp segments 64. As described further below, the rib 68 is designed to crimp the end 26 of the cap 16 into the groove 42 of the fastener body 32. The crimp segments 64 may also have overhanging steps 69 designed to engage a second spring 90, as further described below.

Figure 6:
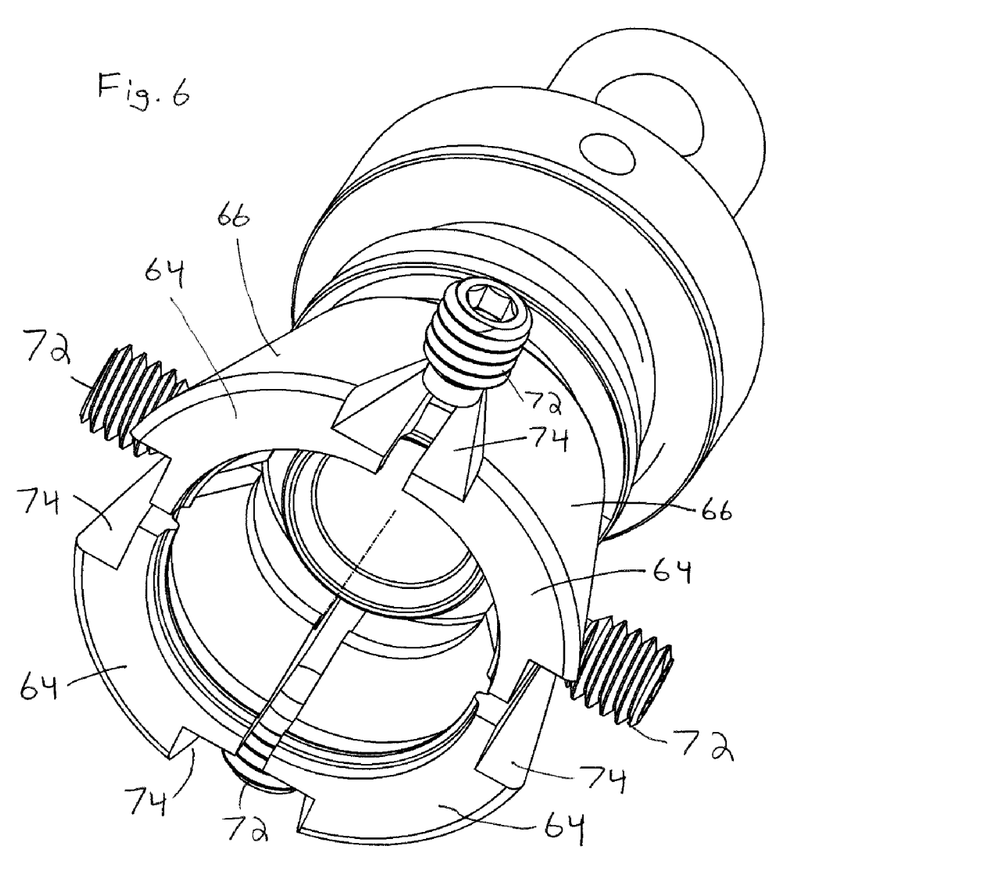
FIG. 6 is a perspective view of the crimp segments and a set screw.

A first spring 70 may be provided inside the internal cavity 56 of the crimp head body 54 between the drive head 60 and the crimp segments 64. Thus, the first spring 70 biases the crimp segments 64 apart from each other. That is, the crimp segments 64 are biased downward relative to the crimp head body 54. The crimp segments 64 are retained within the crimp head body 54 with a retainer 72, which may be one or more set screws 72. The set screws 72 may be threaded through the crimp head body 54 and may engage the crimp segments 64. The bias of the first spring 70 pushes the crimp segments 64 downward until the crimp segments 64 press against the set screws 72 so that the set screws 72 retain the crimp segments 64 in the crimp head body 54. As shown in FIG. 6, the set screws 72 may be located between circumferentially adjacent crimp segments 64. The crimp segments 64 may also be provided with a longitudinal groove 74 along the mating edges of the crimp segments 64. Thus, each crimp segment 64 may form one side of the groove 74. The side surfaces of the groove 74 may be radially straight as shown or may be radially tapered so that the groove 74 tapers inward. In addition, the groove 74 preferably only extends along the bottom portion of the crimp segments 64 and terminates below the top of the crimp segments 64. As shown, the groove 74 may be tapered inward toward the top of the crimp segments 64 in a triangular shape so that the bottom portion of the groove 74 is wider than the top of the groove 74. Depending on how the groove 74 and the set screw 72 are configured and set, the screws 72 may engage the bottom, the sides and/or top of the groove 74 to retain the crimp segments 64 in the crimp head body 54.

The crimp head 48 may also be provided with a centering guide 76 for centering the fastener body 32 within the crimp head 48. For example, the centering guide 76 may be provided with a front cavity 78 for receiving the tapered nose 44 of the fastener body 32. The centering guide 76 may extend down through the crimp segments 64 so that the front cavity 78 is located within an inner cavity 80 of the crimp segments 64. The centering guide 76 may be biased downward toward the fastener holder 50 with a third spring 82. Thus, as illustrated in FIG. 5, it is preferred for the front cavity 78 of the centering guide 76 to contact the fastener body 32 before the rest of the crimp head 48 to initially center the crimp head 48 and fastener body 32. As also shown in FIG. 5, the centering guide 76 may be provided with a center 84 located within the interior cavity 80 of the crimp segments 64. The surface of the center 84 may be angled, or alternatively the internal contacting surface 86 of the crimp segments 64 could be angled, so that the downward spring pressure on the centering guide 76 presses outward against the internal surface 86 of the crimp segments 64 to push the crimp segments 64 outward against the crimp head body 54.

Figure 7:
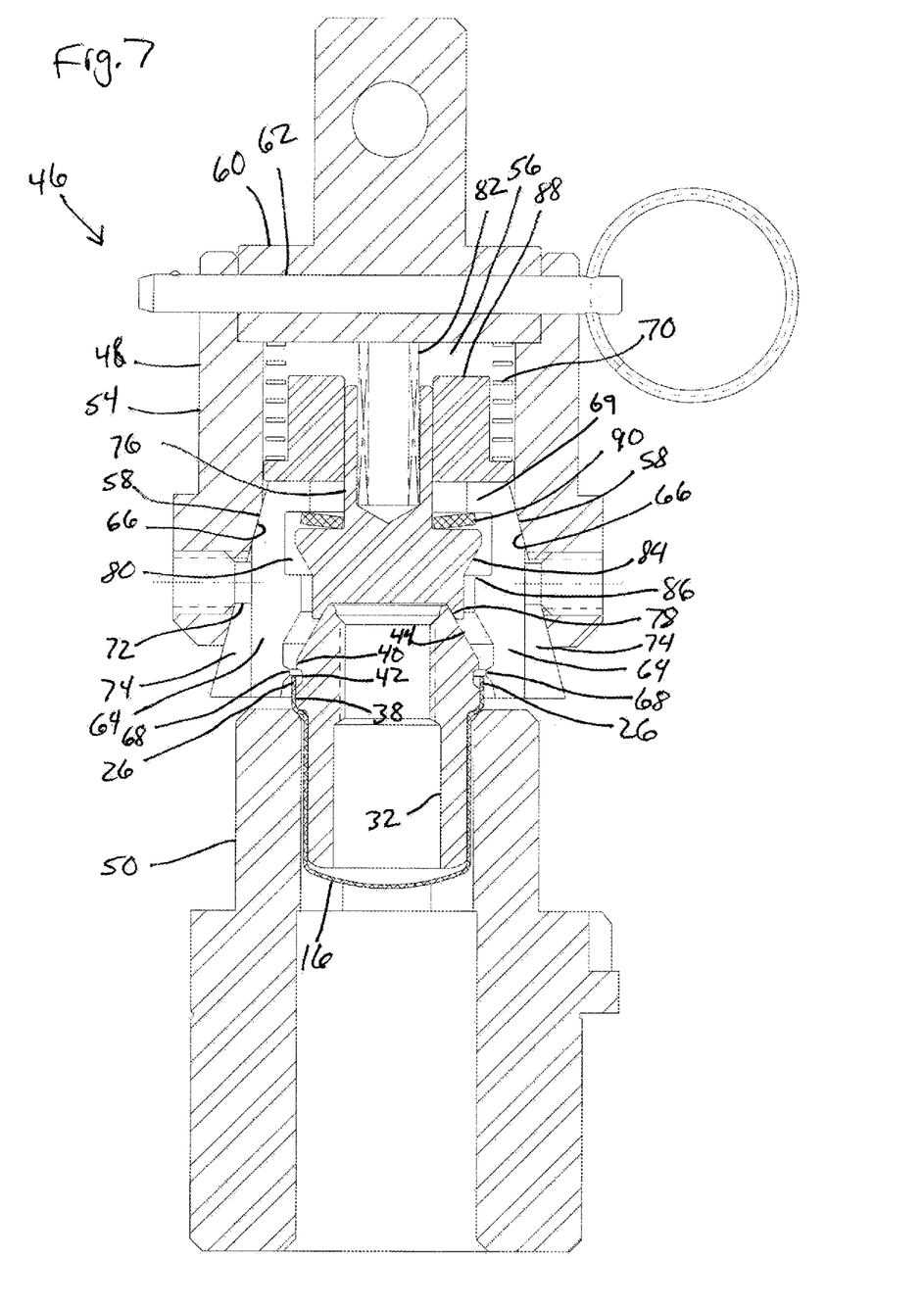
FIG. 7 is a cross-sectional view of the crimp tool at the end of the first stage and at the beginning of the second stage.
Figure 8:
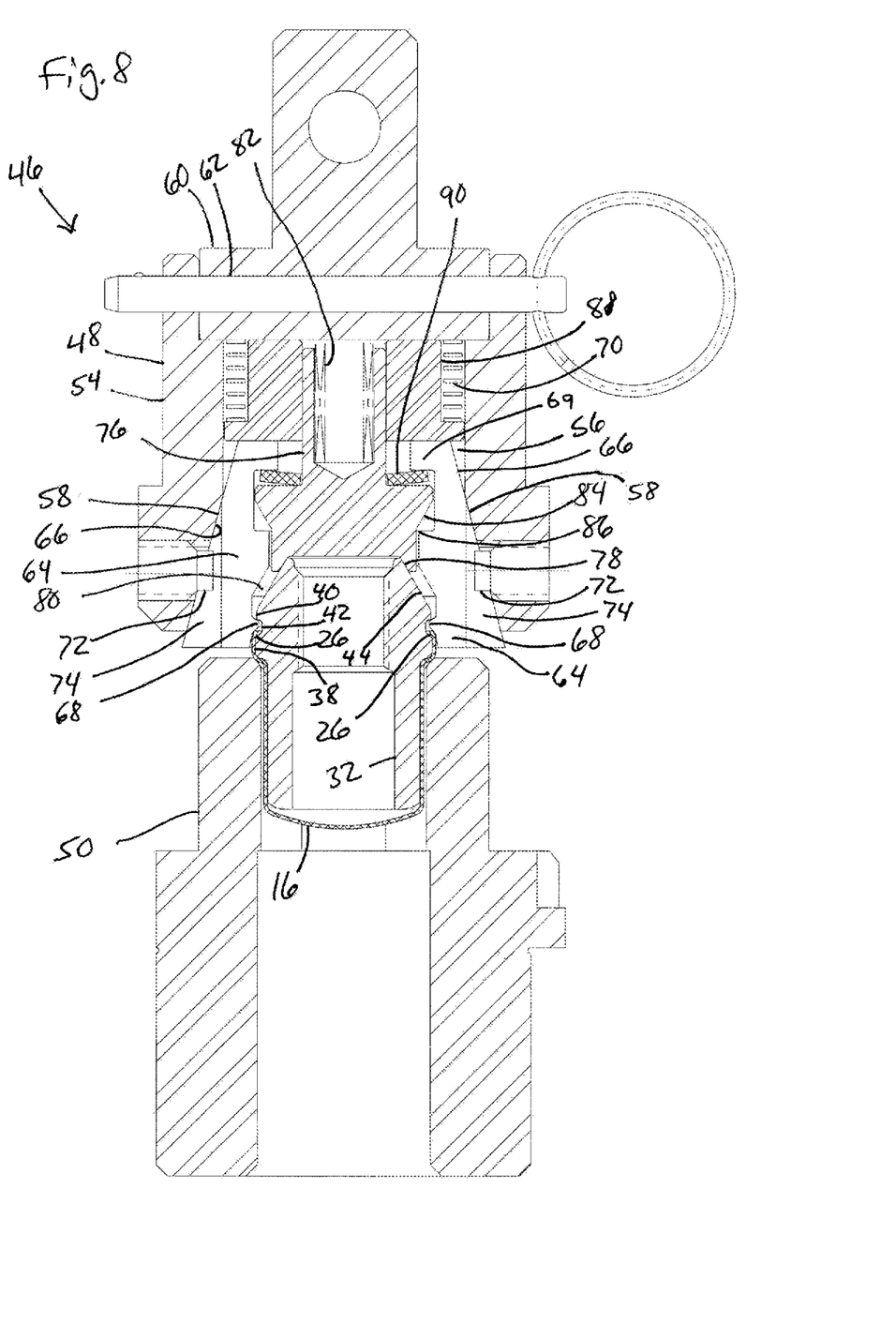
FIG. 8 is a cross-sectional view of the crimp tool at the end of the second stage and at the beginning of the third stage.

As shown in FIG. 7, when the crimp head 48 is further pushed down toward the fastener holder 50, the spring pressure of the first spring 70 may maintain the spacing between the crimp head body 54 and the crimp segments 64 so that the crimp segments 64 and the crimp head body 54 move together toward the fastener holder 50. That is, during the first stage there may be no relative movement between the tapered surfaces 58, 66 of the crimp head body 54 and the crimp segments 64, and the first spring 70 may not be compressed between the crimp head body 54 and the crimp segments 64. Thus, the crimp segments 64 and the rib 68 may move axially toward the fastener holder 50 and the first outer flange 38 without moving radially inward during the first stage. Alternatively, movement of the crimp head 48 toward the fastener holder 50 during the first stage may cause crimp head body 54 to move axially toward the fastener holder 50 more, or at a faster rate, than crimp segments 64 move axially toward the fastener holder 50. Compression of the first spring 70 may allow crimp head body 54 and crimp segments 64 to both move axially toward the fastener holder 50, but at different rates. The strength of the first spring 70 may be varied to adjust the rate at which the crimp segments 64 move toward the fastener holder 50. Accordingly, if crimp segments 64 move axially toward the fastener holder 50 at a slower rate than the crimp head body 54, the tapered surfaces 58, 66 of the crimp segments 64 and the crimp head body 54 slide relative to each other and push the crimp segments 64 radially inward. Therefore, the crimp segments 64 may move axially toward the fastener holder 50 while simultaneously moving radially inward. As a result, the end 26 of the cap 16 may be crimped into the groove 42, as shown in FIG. 8.

During the first stage, the rib 68 moves over the second outer flange 40 and toward the first outer flange 38. As also shown in FIG. 7, during the first stage the crimp segments 64 and the inner surface 86 that initially contacts the center 84 moves axially away from the center 84. Thus, the center 84 only biases the crimp segments 64 outward initially before the crimp segments 64 move away from the center 84. The first stage may end when crimp segments 64 stop moving axially toward the fastener holder 50 as steps 69 on the crimp segments 64 contact the second spring 90, as shown in FIG. 7 and FIG. 8. Alternatively, the first stage may end when steps 69 on the crimp segments contact center 84, if a second spring 90 is not included. The spring pressure of the first spring 70 and second spring 90, or center 84, subsequently hold crimp segments 64 in place axially. As shown in FIG. 8, after the crimp segments 64 bottom out (in this case by contacting the second spring 90), the crimp segments 64 stop moving axially toward the fastener holder 50 while the crimp head body 54 continues to move axially downward. This causes the first spring 70 to compress. As the crimp head body 54 continues to move toward the fastener holder 50, the tapered surfaces 58, 66 of the crimp segments 64 and the crimp head body 54 slide relative to each other and push the crimp segments 64 radially inward. Therefore, during the second stage, the rib 68 moves radially inward into the groove 42 of the fastener body 32 without moving axially toward the first outer flange 38. As a result, the end 26 of the cap 16 is crimped into the groove 42. At the end of the second stage, which is shown in FIG. 8, the first spring 70 becomes completely compressed between the crimp segments 64 and the crimp head body 54. That is, the crimp head body 54 and the crimp segments 64 are no longer able to move axially relative to each other, which in this case occurs when the drive head 60 abuts the spacer 88 between the crimp segments 64 and the drive head 60. Alternatively, as discussed above, the first stage and the second stage may be combined if the crimp segments 64 move axially toward the fastener holder 50 while simultaneously moving radially inward.

Figure 9:
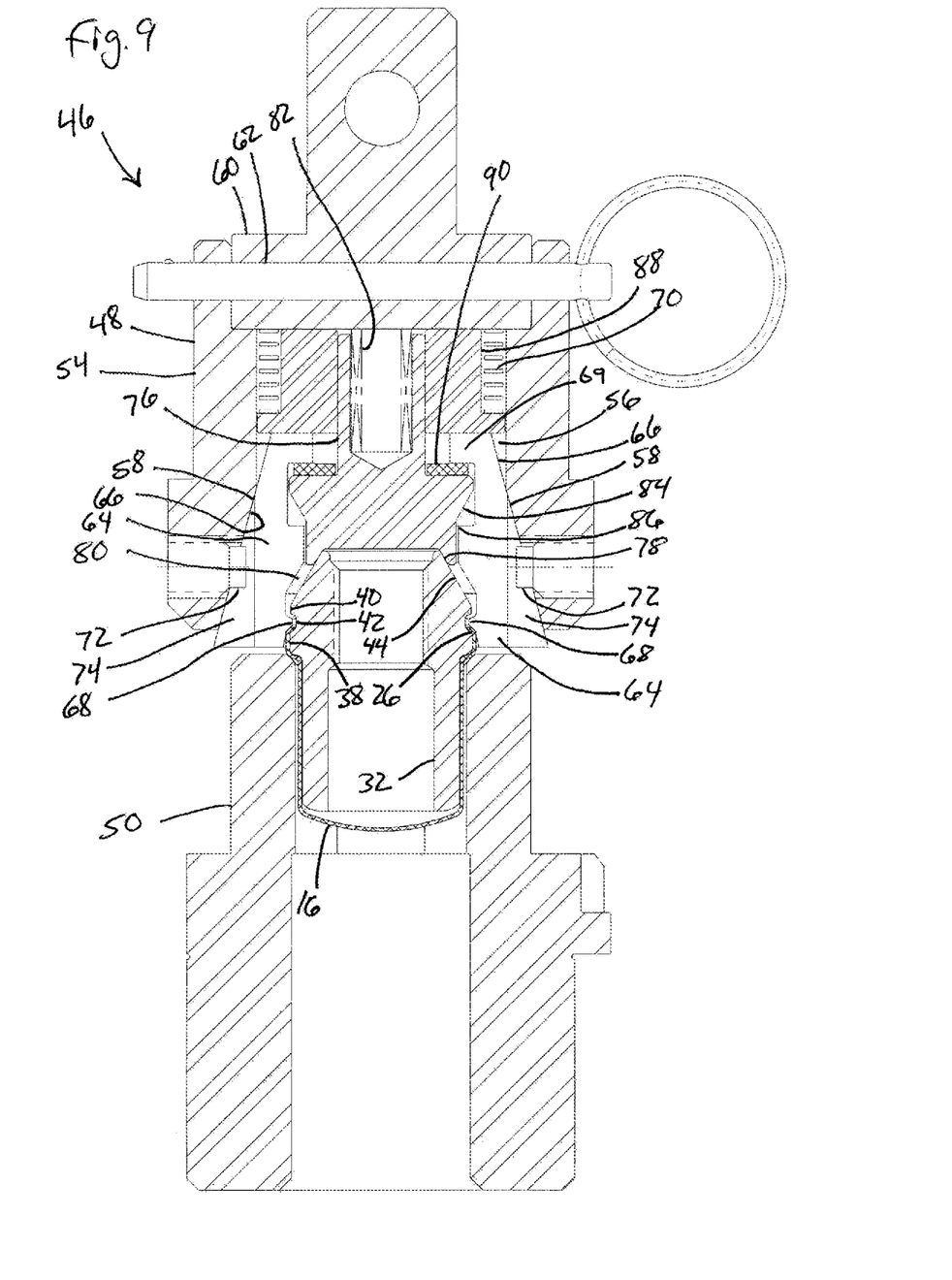
FIG. 9 is a cross-sectional view of the crimp tool at the end of the third stage.

As shown in FIG. 9, the crimp head 48 may also be provided with a second spring 90, such as a Belleville spring 90, between the crimp segments 64 and the centering guide 76. Thus, the second spring 90 biases the crimp segments 64 up away from the fastener holder 50 since the second spring 90 is between the crimp segments 64 and the fastener body 32. Desirably, the bias force of the second spring 90 is higher than the bias force of the first spring 70 so that the second spring 90 is not compressed until the first spring 70 is fully compressed. The length of compression of the second spring 90 is also considerably less than the length of compression of the first spring 70. Because the crimp head body 54 and the crimp segments 64 are no longer able to move axially relative to each other, the crimp head body 54 and the crimp segments 64 move axially together toward the fastener holder 50 during the third stage as the second spring 90 is compressed. That is, during the third stage the crimp segments 64 move axially but do not move radially inward. Therefore, the rib 68 moves axially in the groove 42 toward the first outer flange 38 to further crimp the end 26 of the cap 16 during the third stage. While the third stage is preferable to provide a higher quality crimp, it may not be necessary in certain applications.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A tool for crimping a cap onto a fastener body, the tool comprising:

a fastener holder configured to hold and support the fastener and the cap, wherein the fastener body comprises a thread, a plurality of wrenching surfaces disposed along a top portion of the fastener body, a first outer flange disposed below the wrenching surfaces and extending outward therefrom, a second outer flange disposed below the first outer flange, and a groove disposed between the first and second outer flanges, and the cap being disposed over the wrenching surfaces and the first outer flange, an end of the cap being crimped around the first outer flange, the end being crimped in the groove between the first and second outer flanges, a bottom portion of the fastener body comprising the second outer flange and the thread remaining uncovered by the cap,
wherein the fastener holder receives the cap and the holds the top portion and the wrenching surfaces of the fastener body and with the cap; and
a crimp head comprising a plurality of crimp segments spaced circumferentially around the fastener holder, the crimp segments comprising an inwardly extending rib extending circumferentially around the plurality of crimp segments, the rib configured to move—axially toward the fastener holder over the second outer flange and toward the first outer flange, and the rib configured to simultaneously move radially inward into the groove to crimp the end of the cap into the groove; and
a crimp head body, the crimp head body comprising an internal cavity and a tapered inner surface tapering outwardly toward the fastener holder, the crimp segments comprising a tapered outer surface tapering outwardly toward the fastener holder, the crimp segments received within the internal cavity of the crimp head body and the tapered inner and outer surfaces engaged therewith, the crimp head body configured to move toward the fastener holder relative to the crimp segments, the tapered inner and outer surfaces thereby configured to slide relative to each other and force the crimp segments radially inward.

2. The tool according to claim 1, wherein the rib is configured to move axially within the groove toward the first outer flange without moving radially inward after the rib is configured to move axially toward the fastener holder while simultaneously moving radially inward into the groove.

3. The tool according to claim 1, wherein the crimp head further comprises a centering guide, the centering guide being spring biased against the bottom portion of the fastener body, the centering guide thereby centering the crimp head and the fastener body.

4. The tool according to claim 1, further comprising a first spring disposed between the crimp head body and the crimp segments, the crimp head body and the crimp segments configured to move together toward the fastener holder while compressing the first spring such that the crimp segments move radially inward.

5. The tool according to claim 4, wherein the crimp head body and the crimp segments are configured to move at different rates toward the fastener holder.

6. The tool according to claim 4, further comprising a second spring disposed between the crimp segments and the fastener body, a bias force of the second spring being higher than the first spring such that the first spring is compressed before the second spring is compressed, the crimp head body and the crimp segments configured to move axially together toward the fastener holder while compressing the second spring and without the crimp segments moving radially inward.

7. The tool according to claim 1, further comprising a retainer between the crimp head body and the crimp segments, the retainer retaining the crimp segments within the crimp head body, and a spring biasing the crimp head body and the crimp segments against the retainer.

8. The tool according to claim 7, wherein the retainer is disposed between two of the crimp segments disposed adjacent each other, wherein the retainer is a set screw threaded through the crimp head body, and the adjacent crimp segments comprise a longitudinal groove between the crimp segments, the set screw engaging the groove to retain the crimp segments within the crimp head body.

9. The tool according to claim 1, further comprising a center disposed within the crimp segments, the center comprising a spring and biasing the crimp segments outward against the crimp head body.

10. The tool according to claim 9, wherein the crimp segments move axially away from the center as the crimp head body and the crimp segments move toward the fastener holder, the center thereby only biasing the crimp segments outward before the crimp segments move away from the center.

11. The tool according to claim 1, wherein the fastener holder supports the cap on a top side of the first outer flange, and the crimp head further comprises a centering guide, the centering guide being spring biased against the bottom portion of the fastener body, the centering guide thereby centering the crimp head and the fastener body.

12. A tool for crimping a cap onto a fastener body, the tool the fastener body comprising a thread, a plurality of wrenching surfaces disposed along a top portion of the fastener body, a first outer flange disposed below the wrenching surfaces and extending outward therefrom, a second outer flange disposed below the first outer flange, and a groove disposed between the first and second outer flanges, and the cap being disposed over the wrenching surfaces and the first outer flange, an end of the cap being crimped around the first outer flange, the end being crimped in the groove between the first and second outer flanges, a bottom portion of the fastener body comprising the second outer flange and the thread remaining uncovered by the cap, the tool comprising:
a fastener holder configured to hold and support the fastener body and in the cap disposed over the wrenching surfaces of the fastener body; and
a crimp head comprising a plurality of crimp segments spaced circumferentially around the fastener holder, the crimp segments comprising an inwardly extending rib extending circumferentially around the crimp segments, the rib configured to move—axially toward the fastener holder over the second outer flange and toward the first outer flange, and the rib configured to simultaneously move radially inward into the groove to crimp the end of the cap into the groove;
a crimp head body, the crimp head body comprising an internal cavity the crimp head body configured to move toward the fastener holder relative to the crimp segments,
a first spring disposed between the crimp head body and the crimp segments, the crimp head body and the crimp segments configured to move together toward the fastener holder while compressing the first spring such that the crimp segments move radially inward,
a second spring disposed between the crimp segments and the fastener body, a bias force of the second spring being higher than the first spring such that the first spring is compressed before the second spring is compressed, the crimp head body and the crimp segments configured to move axially together toward the fastener holder while compressing the second spring and without the crimp segments moving radially inward.

* * * * *